US012765561B2

(12) United States Patent
Diuro et al.

(10) Patent No.: US 12,765,561 B2
(45) Date of Patent: Oct. 20, 2026

(54) PEST CONTROL COMPOSITION

(71) Applicant: E.H. (US) LLC, Wilmington, DE (US)

(72) Inventors: Kyle Diuro, Montvale, NJ (US); Bikramjit Singh, Montvale, NJ (US)

(73) Assignee: E. H. (US) LLC, Wilmington, DE (US)

( * ) Notice: Subject to any disclaimer, the term of this patent is extended or adjusted under 35 U.S.C. 154(b) by 574 days.

(21) Appl. No.: 18/002,079

(22) PCT Filed: Jun. 17, 2021

(86) PCT No.: PCT/GB2021/051544

§ 371 (c)(1), (2) Date: Dec. 16, 2022

(87) PCT Pub. No.: WO2021/255466

PCT Pub. Date: Dec. 23, 2021

(65) Prior Publication Data

US 2023/0225333 A1 Jul. 20, 2023

(30) Foreign Application Priority Data

Jun. 18, 2020 (GB) ..................................... 2009314

(51) Int. Cl.

*A01N 65/22* (2009.01)
*A01N 25/04* (2006.01)
*A01N 25/30* (2006.01)
*A01P 17/00* (2006.01)

(52) U.S. Cl.

CPC ............. *A01N 65/22* (2013.01); *A01N 25/04* (2013.01); *A01N 25/30* (2013.01); *A01P 17/00* (2021.08)

(58) Field of Classification Search

None

See application file for complete search history.

(56) References Cited

U.S. PATENT DOCUMENTS

| | | | | |
|---|---|---|---|---|
| 10,398,141 B1 * | 9/2019 | Spragins | .............. | A01N 25/004 |
| 2007/0092544 A1 | 4/2007 | Mills | | |
| 2011/0124504 A1 | 5/2011 | Oester et al. | | |
| 2015/0359230 A1 | 12/2015 | Messina | | |
| 2019/0343122 A1 * | 11/2019 | Coelho | .................. | A01N 37/06 |

FOREIGN PATENT DOCUMENTS

| | | | | | |
|---|---|---|---|---|---|
| CN | 109169730 A | | 1/2019 | | |
| GB | 1241914 A | | 8/1971 | | |
| JP | 2019006703 A | * | 1/2019 | | |
| KR | 19980042095 A | * | 8/1998 | ............. | A61L 9/048 |
| RU | 2518342 C1 | | 6/2014 | | |
| RU | 2524188 C1 | | 7/2014 | | |
| WO | 2019038547 A1 | | 2/2019 | | |

OTHER PUBLICATIONS

Sonobe English Translation (Year: 2019).*
Modi et al., English Translation (Year: 1998).*
Thongsong et al., (The Efficacy of Pure Natural Repellents on Rat Responses Using Circular Open Field, published Dec. 1, 2010 ( Year: 2010).*
International Search Report and Written Opinion for PCT Application No. PCT/GB2021/051544 mailed Sep. 1, 2021.
Combined Search and Examination Report for United Kingdom Application No. 2009314.2 mailed Jun. 20, 2022.
Yang et al., "Modulation of the wettability of excipients by surfactant and its impacts on the disintegration and release of tablets," Drug development and industrial pharmacy. 42. 1-39. (2016).
Gupta et al., "Controlled-release tablets from carrageenans: effect of formulation, storage and dissolution factors," European Journal of Pharmaceutics and Biopharmaceutics, vol. 51, Issue 3, May 2001, pp. 241-248.
O'Donnell et al., "Non-Nutritive Polyol Sweeteners Differ in Insecticidal Activity When Ingested by Adult *Drosophila melanogaster* (Diptera: Drosophilidae)," Journal of Insect Science, vol. 16, Issue 1, 2016, p. 47.

* cited by examiner

*Primary Examiner* — Jake M Vu

(74) *Attorney, Agent, or Firm* — DUNLAP CODDING, P.C.

(57) ABSTRACT

The present invention relates to a pest control composition comprising one or more linear sulphated polysaccharides, one or more surfactants, one or more alkali metal salts of a carboxylic acid, and one or more active ingredients, wherein the composition comprises at least 40 wt. % water, based on the total weight of the composition and wherein the composition has a melting point higher than 30° C. The invention also relates to a pest control product comprising the pest control composition according to the invention and a container in which the composition is contained. The invention relates to a method for preparing said pest control product. Finally, the invention relates to the use of the composition, the product, or the product obtained by the method, as a rodent repellent.

20 Claims, No Drawings

PEST CONTROL COMPOSITION

CROSS-REFERENCE TO RELATED APPLICATIONS

This application is a U.S. National Phase of International Patent Application No. PCT/GB2021/051544, filed on 17 Jun. 2021, which claims priority to United Kingdom Application No. 2009314.2 filed 18 Jun. 2020. The entire contents of these applications are incorporated herein by reference in their entirety.

The present invention relates to a pest control composition, to a pest control product, to a method for preparing the pest control product, and to the use of the composition, the product or the product obtained by the method as a rodent repellent.

BACKGROUND

Existing products such as rodent repellent products are almost exclusively trigger sprays or spreadable granules. Triggers have concern about their overall longevity and the residues they may leave when they are applied. Granules meanwhile have concerns over their safety as they need to be spread over a large area in which they can come in contact with children and pets. Other product formats such as gels are designed to work together with an applicator which heats up the gel formulation to diffuse the actives.

Therefore, there is a need of a composition comprising one or more active ingredients capable of diffusing said active ingredients without the need of an applicator. This means that the formulation should diffuse one or more active ingredients when exposed to air at room temperature. Furthermore, the composition should diffuse said one or more active ingredients during a defined amount of time, meaning that the one or more active ingredients are controlled released.

Furthermore, there is a need of a composition comprising one or more active ingredients that melts at temperatures higher than room temperature, i.e. temperature higher than about 15° C. to 25° C., and that gels at room temperature. This allows for a composition that can be poured into a container and subsequently gels to form a product that provides for a controlled release of said active(s).

It will be understood that the gel must be stable at temperatures higher than, for example, 30° C., because this will allow the gel to be used in various climates and a wide temperature range.

The present disclosure solves the problems associated with spreadable granules or trigger sprays by providing a composition that releases the odour of one or more active ingredients; e.g. essential oils, slowly over several weeks. The composition does not need to be applied or spread; instead it just needs to be exposed to the air in order to start diffusing the active(s).

SUMMARY OF THE INVENTION

In a first aspect, the present invention relates to a pest control composition comprising one or more linear sulphated polysaccharides, one or more surfactants, one or more alkali metal salts of a carboxylic acid, and one or more active ingredients, wherein the composition comprises at least 40 wt. % water, based on the total weight of the composition and wherein the composition has a melting point higher than 30° C.

In one embodiment, the composition comprises at least 50 wt. % water, based on the total weight of the composition, preferably at least 60 wt. %, more preferably at least 70 wt. %, even more preferably at least 80 wt. %.

In another embodiment, the weight ratio water:linear sulphated polysaccharide is at least 50:1, preferably at least 60:1, more preferably at least 70:1 even more preferably at least 80:1.

The one or more linear sulphated polysaccharides may comprise or consist of one or more carrageenans.

The one or more alkali metal salts of a carboxylic acid may comprise or consist of one or more alkali salts of one or more monocarboxylic acids, preferably one or more alkali salts of one or more monocarboxylic acids having less than 5 carbon atoms, more preferably one or more alkali salts of acetic acid.

The one or more active ingredients may comprise one or more essential oils, preferably selected from the group consisting of peppermint oil, cornmint oil and combinations thereof.

In an embodiment, the composition has a melting point between 30° C. and 60° C., preferably between 40° C. and 50° C., more preferably between 40° C. and 45° C.

In another embodiment, the composition comprises at least 0.1 wt. % of the one or more linear sulphated polysaccharides, based on the total weight of the composition, preferably at least 0.5 wt. %, more preferably between 0.5 wt. % and 5 wt. %, even more preferably between 0.5 wt. % and 2.5 wt. %, most preferably between 0.5 wt. % and 2.0 wt. %.

In another embodiment, the weight ratio one or more linear sulphated polysaccharides:one or more alkali metal salts of a carboxylic acid is between 0.25:1 and 2:1, preferably between 0.5:1 and 1.5:1, more preferably between 0.75:1 and 1.25:1, even more preferably about 1:1.

The one or more surfactants may comprise or consist of anionic surfactants, preferably selected from the group consisting of alkali metal salts of fatty acids, alkali metal salts of C8-20 alkyl sulphates, sulfonated monoglycerides of C8-20 fatty acids, sarcosinates, taurates, and combinations thereof, more preferably selected from the group consisting of alkali metal salts of ricinoleic acid, alkali metal salts of dodecyl hydrogen sulphate, and combinations thereof.

In an embodiment, the alkali metal in the alkali metal salts of fatty acids, preferably selected from the group consisting of alkali metal salts of ricinoleic acid, is the same alkali metal in the one or more alkali metal salts of a carboxylic acid, preferably wherein said alkali metal is sodium.

In another embodiment, the composition is a rodent repellent composition.

In a second aspect, the invention relates to a pest control product comprising the pest control composition according to the first aspect and a container in which the composition is contained.

In a third aspect, the invention relates to a method for preparing the pest control product according to the second aspect, wherein said method comprises the steps of:

a) preparing the pest control composition according to the first aspect by mixing all components at a temperature of at least 30° C., preferably at least 40° C., more preferably at least 50° C., even more preferably at least 60° C., most preferably at least 70° C.;
b) pouring the liquid composition obtained in step a) into a container;
c) allowing the liquid composition in the container to gel at a temperature lower than 30° C.

In a fourth aspect, the invention relates to the use of the composition according to the first aspect or the product according to the second aspect or the product obtained by the method according to the third aspect as a rodent repellent.

Definitions

The following definitions are used in the present application.

"Pest control composition" as used in the present patent application means, a composition comprising at least one active ingredient, which is used as a means for directly or indirectly controlling, destroying, attracting or repelling a pest, for example, rodents.

"Pest control product" as used in the present patent application means, a product comprising a pest control composition, which is used as a means for directly or indirectly controlling, destroying, attracting or repelling a pest, for example, rodents.

"Active ingredient" as used in the present patent application means, a component of a pest control composition or product to which the intended effect(s) of the composition or product is(are) attributed, such as controlling, destroying, attracting or repelling a pest.

"Carrageenans" as used in the present application means, linear sulphated polysaccharides extracted from red edible seaweeds. The backbone of carrageenans is composed of d-galactose units linked alternately to $\alpha$-(1→3) and $\beta$-(1→4).

"Gel" as used in the present application means, three-dimensional network which behaves like a solid and that exhibits no flow in the steady-state. A gel has a yield stress, meaning that this material does not flow until a certain shear-stress threshold is overcome.

"Gelling start temperature" as used in the present application means, temperature at which the first signs of gelling are observed in a composition that initially was in a liquid state. This is achieved by bringing a formulation or composition from a high temperature at which the formulation or composition is completely melted to a lower temperature at which the first signs of gelling are observed.

"Gelling finish temperature" as used in the present patent application means, temperature at which a formulation or composition is in a gel state. This is achieved by bringing a formulation or composition from the gelling start temperature to a lower temperature at which the formulation completely gels.

"Melting start temperature" as used in the present patent application means, temperature at which a formulation that is in a gel state starts melting. This is achieved by bringing a formulation or composition from a low temperature at which the formulation or composition is in a gel state to a higher temperature at which the first signs of melting are observed.

"Melting finish temperature" or "Melting point" as used in the present patent application means, temperature at which a formulation or composition is in a liquid state, i.e. melted. This is achieved by bringing a formulation or composition from the melting start temperature to a higher temperature at which the formulation completely melts.

"Essential oils" as used in the present patent application means, volatile and aromatic liquids which are isolated by a physical or chemical process from an odoriferous plant of a single botanical species. The oil bears the name of the plant from which it is derived; for example, rose oil or lavender oil. These essential oils obtained from plants may be extracted by distillation, steam distillation, expression or by extraction with fats or organic solvents.

"Aroma chemicals" as used in the present patent application means, natural isolates or synthetics which have an aroma. The natural isolates are removed as essential oil. The isolates are further modified. For example, rose and lavender oils may be distilled to produce linalool, which may then be acetylated to make linalyl acetate. Aroma chemicals are the main constituents of essential oils. These constituents are generally monoterpenes and sesquiterpenes, including but not limited to alcohols, aldehydes, ketones, esters, oxides and hydrocarbons.

DETAILED DESCRIPTION OF THE INVENTION

In a first aspect, the present invention relates to a composition comprising one or more linear sulphated polysaccharides, one or more surfactants, one or more alkali metal salts of a carboxylic acid, and one or more active ingredients, wherein the composition comprises at least 40 wt. % water, based on the total weight of the composition and wherein the composition has a melting point higher than 30° C.

Preferably said one or more linear sulphated polysaccharides comprise or consist of one or more carrageenans. Carrageenans are obtained from red seaweeds and it has different types depending on the way method used for their extraction. Examples of carrageenans are iota-carrageenan, kappa-carrageenan, lambda-carrageenan, furcellaran, refined and semi-refined carrageenans.

It is known that carrageenans can be used as thickening and stabilizing agents. However, gels based only on carrageenans are unstable and have low melting point.

The present inventors have observed that by adding one or more alkali metal salts of a carboxylic acid, e.g. calcium acetate or sodium acetate, to a composition comprising one or more linear sulphated polysaccharides, e.g. carrageenans, gels are obtained, which are more stable, have higher melting temperatures and have a higher strength. This aids in the slow release of the one or more active ingredients, prolonging the composition's usage time. A higher strength will be seen as a gel having a higher yield stress or a higher shear modulus. Without wishing to be bound to any theory the present inventors believe that the alkali metal salts of a carboxylic acid form strong bonds with the linear sulphated polysaccharides, e.g. carrageenans, which leads to a gel having a high melting point and a high strength.

The present inventors have observed that a composition according to the invention, in which preferably said one or more linear sulphated polysaccharides comprise or consist of one or more carrageenans, allows for a controlled release of the one or more actives. The composition just needs to be exposed to the air at room temperature, i.e. between 15° C. and 25° C., to start diffusing the actives.

The composition may comprise at least 0.1 wt. % of the one or more linear sulphated polysaccharides, based on the total weight of the composition, preferably at least 0.5 wt. %, more preferably between 0.5 wt. % and 5 wt. %, even more preferably between 0.5 wt. % and 2.5 wt. %, most preferably between 0.5 wt. % and 2.0 wt. %.

The one or more active ingredients may comprise one or more essential oils or one or more aroma chemicals. Examples of essential oils are rose oil, lavender oil, peppermint oil, citronella oil, clove oil, geranium oil, mint oil, lemon grass oil, garlic oil, thyme oil, cedar oil, cornmint oil and cinnamon oil. Preferably, the at least one or more essential oils are selected from the group consisting of peppermint oil, cornmint oil and combinations thereof. Peppermint oil, cornmint oil and combinations thereof are preferred because of their efficacy as rodent repellents.

The composition may comprise at least 50 wt. % water, based on the total weight of the composition, preferably at least 60 wt. %, more preferably at least 70 wt. %, even more preferably at least 80 wt. %. Even at such a high water concentration the composition is in a gel state at a temperature lower than 30° C.

The weight ratio water:linear sulphated polysaccharide may be at least 50:1, preferably at least 60:1, more preferably at least 70:1 even more preferably at least 80:1.

The composition according to the invention has a melting point higher than 30° C. This melting point corresponds to the melting finish temperature. The composition may have a melting point of, for example, between 30° C. and 60° C., preferably between 40° C. and 50° C., more preferably between 40° C. and 45° C. A composition with such a melting point can be sued in various climates and in a wider temperature range that a gel based only on carragennans.

Different alkali metal salts of a carboxylic acid influence the melting temperatures, opacity and strength of the compositions. These salts do not however weaken the resulting controlled release of the one or more active ingredients; the active ingredients are still released in a slow, constant, and controlled manner over the life of the product.

Preferably the one or more alkali metal salts of a carboxylic acid comprise or consist of one or more alkali salts of one or more monocarboxylic acids, preferably one or more alkali salts of one or more monocarboxylic acids having less than 5 carbon atoms, more preferably one or more alkali salts of acetic acid.

The weight ratio of the one or more linear sulphated polysaccharides:one or more alkali metal salts of a carboxylic acid may be between 0.25:1 and 2:1, preferably between 0.5:1 and 1.5:1, more preferably between 0.75:1 and 1.25:1, even more preferably about 1:1.

The composition according to the invention comprises one or more surfactants. Examples of surfactants include but are not limited to any one or a combination of anionic, cationic, zwitterionic, nonionic and polymeric surfactants.

Preferably the one or more surfactants comprise or consist of anionic surfactants, preferably selected from the group consisting of alkali metal salts of fatty acids, alkali metal salts of $C_{8-20}$ alkyl sulphates, sulfonated monoglycerides of $C_{8-20}$ fatty acids, sarcosinates, taurates, and combinations thereof, more preferably selected from the group consisting of alkali metal salts of ricinoleic acid, alkali metal salts of dodecyl sulphate, and combinations thereof. Specially preferred are sodium ricinoleate and sodium dodecyl sulphate.

Anionic surfactants have a polar group selected from the group comprising carboxylates, sulphates, sulfonates and phosphates, and an alkyl or aralkyl hydrophobic chain. Anionic surfactants include alkylbenzene sulfonates, metal salts of fatty acids, lauryl sulphate, di-alkyl sulfosuccinate, lignosulfonates etc.

In a preferred embodiment, the alkali metal in the alkali metal in the alkali metal salts of fatty acids, preferably selected from the group consisting of alkali metal salts of ricinoleic acid, is the same alkali metal in the one or more alkali metal salts of a carboxylic acid, preferably wherein said alkali metal is sodium. The present inventors have observed that when the alkali metal in the surfactant is the same alkali metal in the alkali metal salt of the carboxylic acid, the obtained composition is transparent. For example, when the one or more surfactants are sodium ricinoleate and the alkali metal salts of a carboxylic acid is sodium acetate, the composition has a high melting point and it is transparent.

The pest control composition is preferably a rodent repellent composition.

In an embodiment the pest control composition is in the form of a gel.

In a preferred embodiment, the pest control composition comprises one or more carrageenans, one or more anionic surfactants, one or more alkali salts of acetic acid, and one or more essential oils, wherein:

- the composition comprises at least 40 wt. % water, based on the total weight of the composition,
- the composition has a melting point higher than 30° C., and
- the essential oils are selected from the group consisting of peppermint oil, cornmint oil and combinations thereof.

In another preferred embodiment, the pest control composition comprises one or more carrageenans, one or more anionic surfactants, one or more alkali salts of acetic acid, and one or more essential oils, wherein:

- the one or more anionic surfactants are selected from the group consisting of alkali metal salts of ricinoleic acid, alkali metal salts of dodecyl hydrogen sulphate, and combinations thereof, preferably sodium salts of ricinoleic acid, sodium salts of dodecyl hydrogen sulphate, and combinations thereof;
- the composition comprises at least 40 wt. % water, based on the total weight of the composition,
- the composition has a melting point higher than 30° C., and
- the essential oils are selected from the group consisting of peppermint oil, cornmint oil and combinations thereof.

In another preferred embodiment, the pest control composition comprises one or more carrageenans, one or more anionic surfactants, sodium acetate, and one or more essential oils, wherein:

- the one or more anionic surfactants comprise sodium ricinoleate;
- the composition comprises at least 40 wt. % water, based on the total weight of the composition,
- the composition has a melting point higher than 30° C., and
- the essential oils are selected from the group consisting of peppermint oil, cornmint oil and combinations thereof.

In another preferred embodiment, the pest control composition comprises one or more carrageenans, one or more anionic surfactants, potassium acetate, and one or more essential oils, wherein:

- the one or more anionic surfactants comprise sodium lauryl sulphate;
- the composition comprises at least 40 wt. % water, based on the total weight of the composition,
- the composition has a melting point higher than 30° C., and
- the essential oils are selected from the group consisting of peppermint oil, cornmint oil and combinations thereof.

In a second aspect, the invention relates to a product comprising the composition according to the first aspect and a container in which said composition contained.

The container may be made of glass, plastic, ceramic, a polymer, a metal, a post-transition metal, or any other material that is solid at a temperature of at least 80° C.

The product comprising the composition according to the invention starts diffusing said one or more actives once it is exposed to the air. The one or more active ingredients start working and an effect is achieved.

In an embodiment the pest control product is a rodent repellent product.

In a third aspect, the invention relates to a method for preparing the product according to the second aspect, said method comprising the steps of:

a) preparing the pest control composition according to the first aspect by mixing all components at a temperature of at least 30° C., preferably at least 40° C., more preferably at least 50° C., even more preferably at least 60° C., most preferably at least 70° C., b) pouring the liquid composition obtained in step a) into a container, c) allowing the liquid composition in the container to gel at a temperature lower than 30° C.

The temperature reached in step a) should be of at least the finish melting temperature of the composition. Conversely, the temperature in step c) should be at most that of the finish gelling temperature of the composition.

The temperature in step a) needs to be high enough to allow all ingredients, e.g. carrageenan, essential oils, and metal salts, to dissolve in water, which leads to a transparent, translucent or opaque liquid composition.

In a fourth aspect, the invention relates to the use of the composition according to the first aspect or the product according to the second aspect or the product obtained by the method according to the third aspect as a rodent repellent.

The invention will be further described, by way of example, with the reference to the following non-limiting embodiments.

EXAMPLES

Formulations

Several formulations were prepared by mixing the ingredients shown in Table 1 at a temperature of 75° C. The mixture was subsequently poured into a container, e.g. a glass jar. The product formed by the mixture in the container was brought to room temperature, i.e. about 25° C. At this temperature the composition behaved like a gel. Formulation A is a comparative formulation.

TABLE 1

Formulations

| | Formulation | | | | | | |
|---|---|---|---|---|---|---|---|
| Ingredient | A | 1 | 2 | 3 | 4 | 5 | 6 |
| Carrageenan | 1.95 | 0.95 | 0.95 | 0.95 | 0.95 | 0.95 | 0.95 |
| Water | 90.03 | 90.05 | 90.05 | 90.05 | 90.05 | 90.05 | 90.05 |
| Cornmint oil | 3.00 | 3.00 | 3.00 | 3.00 | 3.00 | 3.00 | 3.00 |
| Sodium Lauryl Sulphate 30% | 2.00 | | | | 2.00 | 2.00 | 2.00 |
| Sodium Ricinoleate | | 2.00 | 2.00 | 2.00 | | | |
| Calcium Acetate | | 1.00 | | | 1.00 | | |
| Sodium Acetate | | | 1.00 | | | 1.00 | |
| Potassium Acetate | | | | 1.00 | | | 1.00 |
| Glycerol | 3.00 | 3.00 | 3.00 | 3.00 | 3.00 | 3.00 | 3.00 |
| Additives | 0.02 | 0.00 | 0.00 | 0.00 | 0.00 | 0.00 | 0.00 |

Performance Tests

The performance of the formulations in Table 1 was evaluated by measuring the gelling start temperature, the gelling finish temperature, the melting start temperature, the melting finish temperature and the opacity.

TABLE 2

Performance of different formulations

| Formulation | Gelling start temperature (° C.) | Gelling finish temperature (° C.) | Melting start temperature (° C.) | Melting finish temperature (° C.) | Opacity |
|---|---|---|---|---|---|
| A | 35 | 30 | 35 | 42 | Opaque |
| 1 | 42 | 32 | 45 | 55 | Opaque |
| 2 | 30 | 25 | 35 | 41 | Transparent |
| 3 | 35 | 28 | 43 | 55 | Translucent |
| 4 | 41 | 31 | 44 | 55 | Opaque |
| 5 | 37 | 32 | 40 | 49 | Opaque |
| 6 | 50 | 45 | 53 | 58 | Opaque |

Table 2 clearly shows that formulation A, not according to the invention as it does not contain any alkali metal salt of a carboxylic acid, has a gelling start temperature that is the same as the melting start temperature. Furthermore, the obtained composition is opaque.

Formulations 1 to 6, which are according to the invention, release the active ingredient in a controlled manner over time and melt at a temperature that is higher than the gelling temperature, ensuring that these formulations or compositions are stable at any condition in a home setting. Furthermore, formulation 2 is transparent.

Hence one or more objects of the present invention are achieved by the present which is further elucidated in the appended claims.

The invention claimed is:

1. A pest control composition comprising:

one or more carrageenans;

one or more surfactants;

at least one acetate salt selected from the group consisting of sodium acetate, potassium acetate, calcium acetate, and mixtures thereof;

one or more active ingredients; and water, present in an amount of at least 40 wt. % of the total weight of the pest control composition;

wherein the weight ratio of the one or more carrageenans to the at least one acetate salt is in a range of from 0.75:1 to 1.25:1;

wherein the pest control composition is in the form of a gel; and wherein the gel has a melting point higher than 30° C.

2. The pest control composition according to claim 1, wherein the pest control composition comprises at least 50 wt. % water, based on the total weight of the pest control composition.

3. The pest control composition according to claim 1, wherein the weight ratio of the water to the one or more carrageenans is at least 50:1.

4. The pest control composition according to claim 1, wherein the one or more active ingredients comprise one or more essential oils selected from the group consisting of peppermint oil, cornmint oil, and combinations thereof.

5. The pest control composition according to claim 1, wherein the gel has a melting point between 30° C. and 60° C.

6. The pest control composition according to claim 1, wherein the pest control composition comprises at least 0.1 wt. % of the one or more carrageenans, based on the total weight of the pest control composition.

7. The pest control composition according to claim 1, wherein the weight ratio of the one or more carrageenans to the at least one acetate salt is about 1:1.

8. The pest control composition according to claim 1, wherein the one or more surfactants comprises anionic surfactants selected from the group consisting of alkali metal salts of fatty acids, alkali metal salts of $C_{8-20}$ alkyl sulphates, sulfonated monoglycerides of $C_{8-20}$ fatty acids, sarcosinates, taurates, alkali metal salts of ricinoleic acid, alkali metal salts of dodecyl hydrogen sulphate, and combinations thereof.

9. The pest control composition according to claim 8, wherein the alkali metal in the alkali metal salts of fatty acids is sodium, and the at least one acetate salt is sodium acetate.

10. The pest control composition according to claim 1, wherein the pest control composition is a rodent repellent composition.

11. A pest control product comprising the pest control composition according to claim 1 and a container in which the pest control composition according to claim 1 composition is contained.

12. A method for preparing the pest control product according to claim 11, wherein said method comprises the steps of:

a) preparing the pest control composition according to claim 1 by mixing all components at a temperature of at least 30° C.;

b) pouring the liquid composition obtained in step a) into a container; and c) allowing the liquid composition in the container to gel at a temperature lower than 30° C.

13. A method of using the pest control product of claim 11 as a rodent repellent, the method comprising:

exposing the pest control composition contained within the container to air, whereby the one or more active ingredients diffuse from the pest control composition at room temperature and function as a rodent repellent.

14. The pest control composition according to claim 1, wherein the composition diffuses the one or more active ingredients over a period of time to provide a controlled release of the one or more active ingredients.

15. The pest control composition of claim 14, wherein the controlled release of the one or more active ingredients occurs over multiple weeks.

16. The pest control composition of claim 1, wherein the gel is transparent.

17. The pest control composition according to claim 1, wherein the one or more active ingredients comprises cornmint oil.

18. The pest control composition according to claim 17, wherein the pest control composition is free of peppermint oil.

19. The pest control composition according to claim 6, wherein the pest control composition comprises 0.5 to 2.0 wt. % of the one or more carrageenans, based on the total weight of the pest control composition.

20. The pest control composition according to claim 9, wherein the one or more surfactant comprises sodium salts of ricinoleic acid or dodecyl hydrogen sulphate.

* * * * *